United States Patent [19]

Cunningham

[11] Patent Number: 4,645,245
[45] Date of Patent: Feb. 24, 1987

[54] QUICK CONNECT TUBE COUPLING

[75] Inventor: Gail M. Cunningham, Vassar, Mich.

[73] Assignee: General Motors Corporation, Detroit, Mich.

[21] Appl. No.: 784,771

[22] Filed: Oct. 7, 1985

[51] Int. Cl.$^4$ ............................................. F16L 39/00
[52] U.S. Cl. ................................... 285/321; 285/347; 285/351; 285/353
[58] Field of Search ................. 285/45, 353, 356, 321, 285/347, 351

[56] References Cited

U.S. PATENT DOCUMENTS

| | | | |
|---|---|---|---|
| 4,133,564 | 1/1979 | Sarson et al. | 285/321 |
| 4,191,408 | 3/1980 | Acker | 285/321 X |
| 4,335,908 | 6/1982 | Burge | 285/356 X |

*Primary Examiner*—Richard J. Scanlan, Jr.

*Attorney, Agent, or Firm*—Arthur N. Krein

[57] ABSTRACT

A quick connect tube coupling assembly includes a tube end assembly axially insertable into a coupling body assembly, the latter including a body member provided with a stepped bore therein to receive an elastomeric oil seal, a radially flanged retainer seat, a split ring retainer and a hollow tube nut threadingly received in the body member. The tube end assembly includes a straight walled tube having a lead-in chamfer at its free end and which is provided on its outer peripheral surface with a retainer receiving groove and with an axially spaced apart groove receiving a dust seal ring which is located so as to be wedged against an outwardly flared camming ramp wall at the outboard end of the tube nut during assembly of the tube end assembly into the coupling body assembly.

2 Claims, 2 Drawing Figures

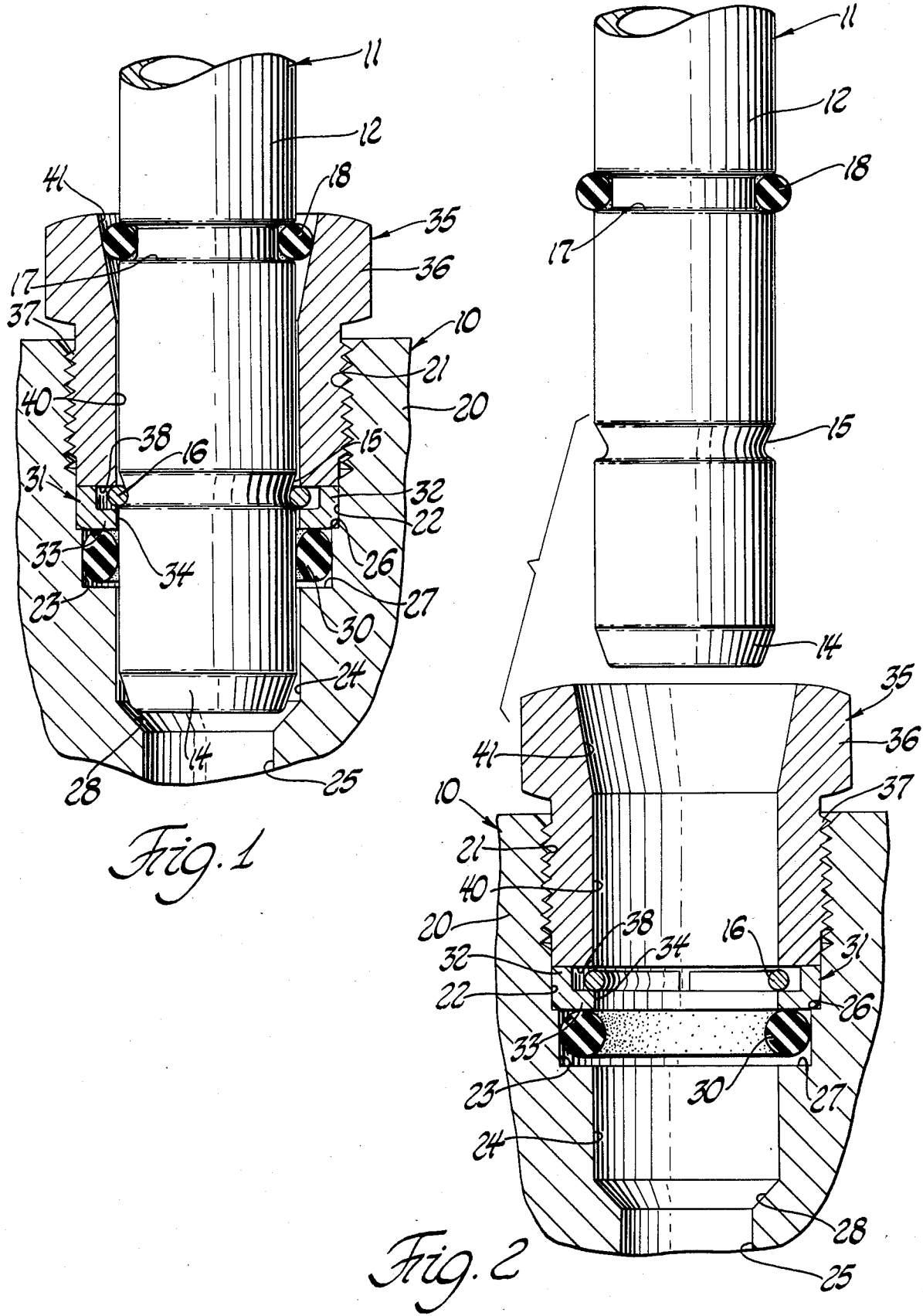

4,645,245

QUICK CONNECT TUBE COUPLING

FIELD OF THE INVENTION

This invention relates to tube couplings and, in particular, to a quick connect tube coupling assembly for use in hydraulic systems.

DESCRIPTION OF THE PRIOR ART

Quick connect tube couplings, of the type which permit initial assembly by mere insertion of the end of a tube into a body assembly, are well known in the art as disclosed, for example, in U.S. Pat. No. 4,133,564 issued Jan. 9, 1979 to Charles R. Sarson and Frederick S. Browne and U.S. Pat. No. 4,191,408 issued Mar. 4, 1980 to Richard C. Acker. Such couplings usually provide a resilient seal ring sealingly engaged by the tube and a split ring lock system for the tube, the arrangement being such as to allow the threaded parts of the coupling to be preassembled prior to insertion of the tube.

SUMMARY OF THE INVENTION

The present invention relates to an improved quick connect tube coupling assembly wherein an O-ring oil seal, a seat retainer and a split ring retainer are axially retained in the stepped bore of a tube receiving body member by a tube nut threaded into the stepped bore, this coupling body assembly being adapted to receive a tube having axially spaced apart grooves, one of which is adapted to receive the split ring retainer and the other has a dust seal ring operatively positioned therein with the dust seal ring thus being located so as to abut against an outwardly flared camming ramp opening at the outboard end of the tube nut.

It is therefore a primary object of the invention to provide an improved quick connect tube coupling having a straight wall tube with axially spaced apart annular split ring retainer and dust seal ring receiving annular grooves therein with a dust seal ring positioned in the latter groove that is adapted to be inserted into a coupling sub-assembly that includes an oil seal ring, a retainer seat and a split ring retainer axially retained in the stepped bore of a body member by a tube nut having an internal outwardly flared camming ramp wall at its outboard end for sealing engagement with the dust seal ring.

Another object of the invention is to provide an improved quick connect tube coupling wherein the tube is sealingly engaged at axially spaced apart locations by both a hydraulic seal and a dust seal which are also operative to reduce pivotal movement of the tube relative to the normal axis of the coupling.

For a better understanding of the invention as well as other objects and further features thereof, reference is had to the following detailed description of the invention to be read in connection with the accompanying drawings.

BRIEF DESCRIPTION OF THE DRAWINGS

FIG. 1 is a side elevational view, partly in longitudinal section, of an assembled quick connect tube coupling assembly in accordance with the invention; and, FIG. 2 is an exploded view of the quick connect tube coupling assembly of FIG. 1 before insertion of the tube assembly into the body assembly of the coupling.

DETAILED DESCRIPTION OF THE INVENTION

Referring now to the drawings, the quick connect tube coupling assembly in accordance with the invention includes, in effect, a coupling body assembly, generally designated 10, and a tube end assembly, generally designated 11, both of which, as shown in FIG. 2, can be assembled as sub-assemblies prior to insertion of the tube end assembly 11 into the coupling body assembly 10 to the position shown in FIG. 1.

Referring first to the tube end assembly 11, it includes a straight walled tube 12 with its free end provided with a lead-in chamfer 14 for a purpose to be described hereinafter. In addition tube 12 is also provided with a first or split retainer receiving annular groove 15 in its outer peripheral surface located a predetermined axial extent from the chamfered free end of the tube 12 so as to receive a portion of a split ring retainer 16 described further hereinafter, and a second or dust seal receiving annular groove 17 axially spaced from the first groove 15 a predetermined distance to receive an elastomeric O-ring dust seal 18. In the construction illustrated, the first O-ring retainer groove 15 is configured so as to receive a split ring retainer 16 that is of circular configuration when viewed in a cross-section thereof. However, it will be apparent to those skilled in the art that the groove 15 can be suitably configured, if desired, to receive a split ring retainer of square or rectangular cross-sectional configuration. Preferably both grooves 15 and 17 are roll formed on the tube 12 in a manner well known in the art.

The coupling body assembly 10 includes as an element thereof a body member 20, which can be a pump body, valve body or other element of a hydraulic systems or, alternatively it may be formed as a separate adapter nut for threaded connection to such an element of a hydraulic system. As shown, the body member 20 is provided with a stepped bore therein so as to define in succession, starting from the outboard end thereof, an outer internally threaded wall 21, a first intermediate wall 22, a second intermediate wall 23, a tube 12 receiving wall 24 and an inboard wall 25 defining a fluid passage, with these walls being of decreasing predetermined internal diameters in the order listed.

Walls 22 and 23 are interconnected by a flat shoulder 26. Walls 23 and 24 are interconnected by a flat shoulder 27. Walls 24 and 25 are connected by an inclined shoulder 28.

As illustrated, wall 24 is of a suitable internal diameter so as to slidably receive the tube 12, while wall 23 is of a suitable internal diameter so that an oil seal 30, in the form of an elastomeric O-ring seal, can be located therein so as to sealingly abut against the wall 23. In addition, the wall 22 is sized so as to receive a L-shaped, washer-like, retainer seat 31 therein. Retainer seat 31 includes an annular ring portion 32, of an external diameter corresponding to the internal diameter of wall 22, with a radial annular flange washer 33 extending radially inward therefrom so that its inboard face can serve as a stop wall for the oil seal 30 when pressurized hydraulic fluid is present in the fluid passage defined by the inboard wall 25, with the opening 34 in this flange washer 33 being of a suitable internal diameter so as to slidably receive the tube 12.

A hollow, tube nut 35 having a wrenching head 36 at its outboard end and an externally threaded shank 37 is threadingly engaged with the internally threaded wall 21 of the body member 20, and during assembly of the tube nut 35 to body element 20 it is torqued down so that its inboard end 38 is brought into abutment with the free end of the ring portion 32 of retainer seat 31 to force it into abutment against the shoulder 26. The retainer seat 31 is thus positioned so as to define with the inboard end 38 of the tube nut 35 an annular groove of a suitable width and depth whereby it is adapted to loosely receive the split ring retainer 16, as shown in FIG. 2, with the inboard end 38 of the tube nut 35 and outboard face of the flange washer 33 of the retainer seat 31 defining the spaced apart shoulders of the groove receiving the split ring retainer 16, as best seen in this Figure.

The tube nut 35 is provided with a bore therethrough to define an internal tube receiving wall 40 at its inboard end of a diameter comparable to tube receiving wall 24 and coaxial therewith an outwardly flared or camming ramp wall 41 of a predetermined angle relative to the axis of the tube nut and of an internal diameter at the outboard or wrenching head 36 end of the tube nut 35 greater than the nominal outside diameter of the dust seal ring 18.

During assembly of the tube end assembly 11 into the coupling body assembly 10, from the position shown in FIG. 2 to that shown in FIG. 1, the chamfered end 14 of the tube 12 and the camming ramp wall 41 facilitates its entry into the tube receiving wall 40 of the tube nut 35, the camming ramp wall 41 then later serving to compress the dust seal 18, as shown in FIG. 1. Then as the chamfered end 14 of the tube 12 enters the opening of the split ring retainer 16 and then the oil seal 30, it serves as a camming ramp to radially first expand the split ring retainer 16 so that it can slide over the tube 12 and to also compress the oil seal 30 radially outward so that it will ride onto the main body of the tube 12 into sealing engagement with the outer peripheral surface of the tube 12 and the wall 23, as shown in FIG. 1.

The tube end assembly 11 is then further pressed axially into the coupling assembly 10 until the split ring retainer 16 is in position to snap radially inward into the groove 15 so that it can serve as an abutment shoulder means for abutment against the sides of the groove 15 in the tube and also for abutment against either of the opposed faces of the tube nut 35 and inboard face of the flange washer 33 to thereby limit further axial movement of the tube 12 in either direction. As will now be apparent, as the tube 12 is pushed to the position shown in FIG. 1, the dust seal ring 18 will enter the flared open end of the tube nut 35, so that the camming ramp wall 41 can act on this dust seal ring so as to radially compress the dust seal ring 18 whereby it will sealingly engage both the tube 12 and the camming ramp wall 41.

It will be appreciated that as the tube end assembly 11 is axially pressed into the coupling assembly 10, the oil seal 30 can move axially, as limited by shoulder 27, to another position than that shown in FIGS. 1 and 2. However, since the oil seal 30 is operative as a dynamic seal, as soon as pressurized hydraulic fluid is present in the passage 25, the oil seal will be axially moved by the pressure of the hydraulic fluid into sealing engagement with the inboard face of the flange washer 33, the position shown in FIG. 1.

Thus during assembly of the tube end assembly 11 into the coupling body assembly 10, the dust seal 18 is wedged into the camming ramp wall 41 angle of the tube nut 35 whereby to provide a seal to keep contaminates from entering the coupling assembly. Thus dust seal 18 is thus also operative to, in effect, preload the assembly by maintaining an axial force on the tube 12 caused by the ramp angle of the camming ramp wall 41 on the tube nut 35 to resist axial movement of the tube 12. In addition since the tube 12, as then assembled to the coupling body assembly 10, is then sealingly engaged by both the oil seal ring 30 and by the dust seal ring 18 at axially spaced apart locations, possible pivotal movement relative to the axis of the stepped bore in the body member 20 is substantially eliminated.

As should now be apparent to those skilled in the art, disassembly of the coupling assembly shown in FIG. 1 is accomplished by first removing the tube nut 35.

While the invention has been described with reference to the structure disclosed herein, it is not confined to the specific details set forth, since it is apparent that modifications and changes can be made by those skilled in the art. This application is therefore intended to cover such modifications or changes as may come within the purposes of the improvements or scope of the following claims.

The embodiments of the invention in which an exclusive property or privilege is claimed are defined as follows:

1. A quick connect tube coupling assembly including a body member, a straight walled tube, a retainer seat a split ring retainer, a first ring seal, a second ring seal and a tubular nut; said body member having a stepped bore extending from an outboard end thereof to define an internally threaded wall, a first intermediate wall, a second intermediate wall, a tube receiving wall and a fluid passage; said first ring seal being operatively positioned in said body member to sealing engage said second intermediate wall and said tube; said retainer seat having an axially extending ring portion and a radial inward extending flange washer portion at one end thereof that is operatively received by said first intermediate wall, said tubular nut being threadingly received in said internally threaded wall so as to abut against an end of said ring portion of said retainer seal opposite said washer portion which is sized to receive said tube and to define on one side thereof an abutment shoulder for said ring seal and on the other side thereof defining with said ring portion and the inboard end face of said tubular nut an annular groove in which said split ring retainer is operatively positioned; said tube having a chamfered free end, an annular first retainer groove for said split ring retainer located a predetermined distance from said chamfered free end of said tube and an annular second groove, receiving said second ring seal, located a predetermined distance from said retainer groove; said tubular nut having a bore extending therethrough defining a tube receiving passage at its inboard end and an outwardly flared camming surface at its outboard end against which said second ring seeal is sealingly compressed.

2. A quick connect tube coupling assembly including a body means, a hollow nut, a retainer seat, a split ring retainer, a first seal ring, a second seal ring, and a tube; said body means having a stepped bore therein defining in succession, starting from the exterior of the body means, an outer internally threaded wall, an intermediate wall means, a second intermediate tube receiving wall interconnected to said first intermediate wall means by a flat radial shoulder, and an inboard wall defining a fluid passage that is interconnected to said second intermediate wall by a tapered shoulder, said walls being of progressively reduced internal diameters relative to said internally threaded wall, said retainer seat having an annular axially extending ring portion of a diameter to be slidably received in said intermeidate wall means and a radial inward extending flange washer portion having an internal diameter corresponding to the internal diameter of said second intermediate tube receiving wall, said retainer seat and said first seal ring being positioned in said intermediate wall means with said first seal ring being positioned next adjacent to said radial flat shoulder, said nut having a wrenching head portion with an externally threaded shank extending therefrom and having a bore passage extending therethrough including a tube receiving portion that terminates at an outwardly flared camming ramp portion at the wrenching head portion of said nut, said hollow nut as threaded into said internally threaded wall has the inboard end face thereof in abutment against said seat retainer whereby said flange portion and said axially extending ring portion of said retainer seat defines with said inboard end face of said nut an annular groove adapted to receive a portion of said split ring retainer; said tube having a nominal external diameter whereby it is adapted to be slidably received in said bore passage of said nut and said second intermediate tube receiving wall of said body means and terminating at its free end in an inwardly tapered frustro-conical surface, said tube further having an annular retainer groove axially spaced from said free end receiving said split ring retainer and an annular seal groove axially spaced from said retainer groove in which said second seal ring is operatively positioned whereby when said tube is assembled to said body means said first seal ring sealingly encircles said tube, said retainer ring is received in said annular retainer groove and said second seal ring sealingly engages said camming ramp portion of said nut and said tube.

* * * * *